United States Patent [19]
Carter

[11] 4,053,343
[45] Oct. 11, 1977

[54] METHODS OF MAKING FIBER REINFORCED PLASTIC PIPE

[75] Inventor: J. Warne Carter, Wichita Falls, Tex.

[73] Assignee: Ciba-Geigy Corporation, Ardsley, N.Y.

[21] Appl. No.: 359,065

[22] Filed: May 10, 1973

[51] Int. Cl.$^2$ .................. B65C 3/26; B65H 81/06
[52] U.S. Cl. .................................. 156/172; 156/187; 156/191; 156/287; 156/289
[58] Field of Search .............. 156/149, 156, 161, 162, 156/166, 172, 187, 190–192, 195, 247, 272, 287, 289, 425, 428–432, 446, 447, 547

[56] References Cited
U.S. PATENT DOCUMENTS

| | | | |
|---|---|---|---|
| 3,068,133 | 12/1962 | Cilker et al. | 156/428 X |
| 3,700,519 | 10/1972 | Carter | 156/156 |

Primary Examiner—Charles E. Van Horn
Assistant Examiner—John E. Kittle
Attorney, Agent, or Firm—Karl F. Jorda; Harry G. Shapiro

[57] ABSTRACT

In a continuous method of making pipe from fiber elements coated with a thermosetting resin, the coated fiber elements are wrapped around a resin saturated conveyor tube which becomes an integral part of the finished pipe assembly. The method of manufacture employs a first mandrel section and a second mandrel section in alignment therewith and longitudinally spaced therefrom by a gap. A tube of resin-absorbent material is applied to the first mandrel section, a thermosetting resin is applied to the tube as it passes over the gap in an amount sufficient to saturate the tube. The resin is at least partially cured prior to its arrival onto the second mandrel section where it provides the conveyor tube for the application thereto of a plurality of bands of continuous fiber elements coated with a thermosetting resin composition.

11 Claims, 9 Drawing Figures

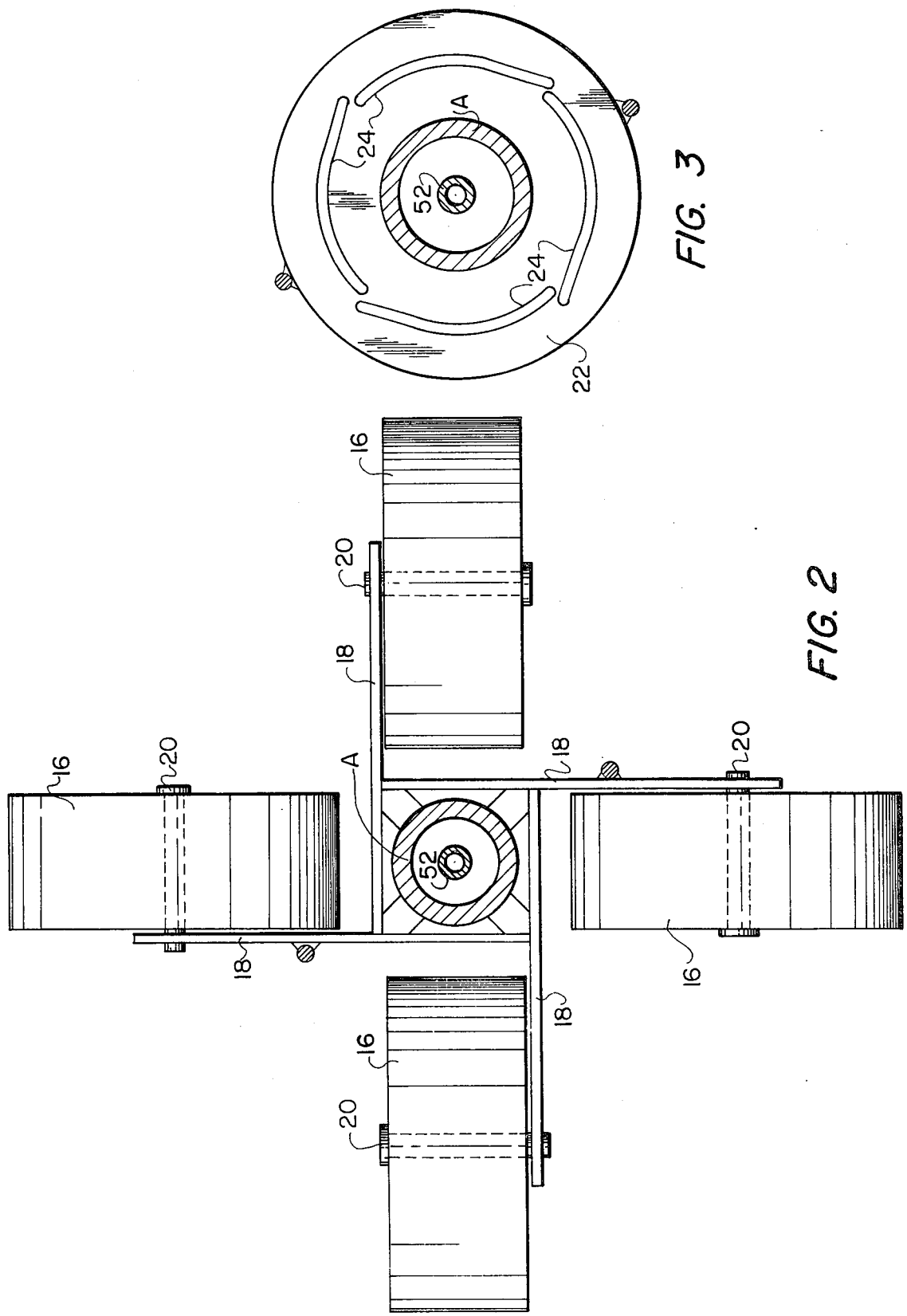

METHODS OF MAKING FIBER REINFORCED PLASTIC PIPE

The invention relates to improvements in methods of making fiber reinforced plastic pipe, and is more particularly directed to improvements in methods of continuously making pipe of the type utilizing a conveyor tube which becomes an integral part of the completed pipe assembly.

BACKGROUND OF THE INVENTION

As disclosed in my U.S. Pat. Nos. 3,507,412; Apr. 21, 1970 and 3,700,519; Oct. 24, 1972, the use of an air impervious conveyor tube which becomes an integrated part of the completed pipe assembly of resin and fiber in a continuous method of making the pipe assembly is known. In continuous methods of making fiber reinforced plastic pipe it has been the practice to use mandrels. Some provision must be made to prevent the conveyor tube from sticking to the mandrel. As disclosed in the aforementioned patents, a belt system has been used wherein the belts are coated with a mold release material. Also, and particularly where the conveyor tube will be made to provide a resin-rich surface on the interior of the pipe, or will be saturated with a resin composition, a cellophane casing has been used for contact with the mandrel. The cellophane acts as a release material, and must be subsequently stripped from within the finished pipe assembly.

A primary object of the present invention is to provide a method of continuously making fiber reinforced plastic pipe of the type having a resin-saturated conveyor tube which becomes an integrated part of the finished pipe assembly wherein it is unnecessary to resort to a stripping step, or to remove release material from within the finished product. Further, the conveyor tube preferably is made so that it has a resin-rich inner surface or liner. Nevertheless, it is unnecessary to use a belt assembly or a like mechanism in order to enable the manufacture of the product.

As will hereinafter appear, the method of the invention is simple. The equipment used to fabricate the pipe is of simple construction, and the steps involved to produce the product are minimal in number, particularly in that it is not necessary to resort to a final stripping step though the finished product includes a resin-rich liner.

SUMMARY OF THE INVENTION

To produce fiber reinforced plastic pipe in which the conveyor tube is made an integrated part of the pipe and in which the conveyor tube is formed to provide a resin-rich inner surface for the completed pipe, a mandrel is used which comprises a first mandrel section and second mandrel section in alignment therewith and longitudinally spaced therefrom by a gap. A tube of resin-absorbent material is applied to the first mandrel section. The tube is continuously advanced across the gap and over the second mandrel section. As the tube passes over the gap a thermosetting resin is applied in an amount sufficient to saturate the tube. Prior to the arrival of the advancing resin-saturated tube onto the second mandrel section, the resin is at least partially cured to thereby provide a tube which may serve as a means to convey the subsequently applied wrappings or layers or bands of material applied thereto. Then the plurality of bands of thermosetting composition coated continuous fiber elements such as glass rovings are applied to the conveyor tube, and the thermosetting resin is cured to provide the fiber reinforced assembly having the conveyor tube integral therewith.

Preferably, when the thermosetting resin is applied to the tube as it passes over the gap it is applied in an amount which is also sufficient to provide a coating on the inner side to thereby furnish a conveyor tube having a resin-rich inner liner. Also, the resin saturant for the tube is preferably cured prior to the application thereto of the plurality of bands of thermosetting resin composition coated continuous fiber elements. Also, it is preferred that the tube of resin-absorbent material applied or formed upon the first mandrel section be reinforced prior to the application of the thermosetting resin saturant thereto as it passes over the gap. For this purpose, a strip of reinforcing strands coated with a substantially dry, partially gelled thermosetting resin is wrapped around the tube while the tube is on the first mandrel section and heat is applied to cause the strands to be bonded to the tube. Since the heat is applied while the advancing tube is still on the first mandrel section, the heat is applied in an amount to cause the strands to be bonded to the tube while inhibiting the flow of resin to the inner side of the tube.

The advantages and improved results furnished by the methods of the invention will be apparent from the following detailed description, taken in conjunction with the drawings.

BRIEF DESCRIPTION OF THE DRAWINGS

FIG. 2 is a more detailed showing of the means for forming a conveyor tube from strips of material withdrawn from rolls;

FIG. 3 is an elevational view partly in cross-section, showing a guide plate for the strips;

DESCRIPTION OF THE PREFERRED EMBODIMENT

Figure 1:
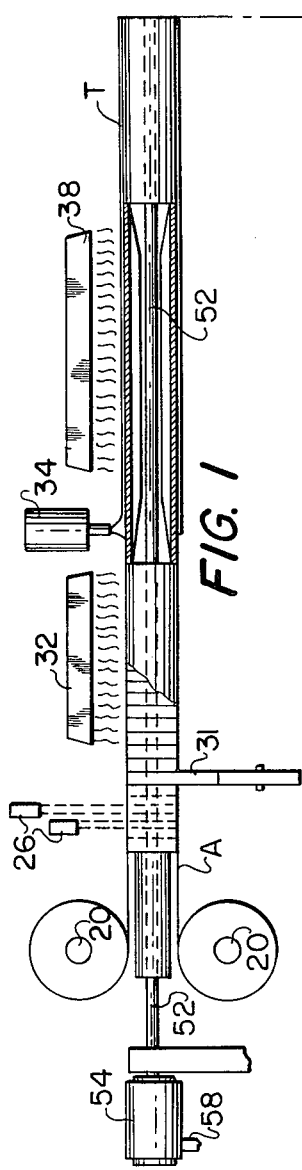
FIGS. 1, 1A and 1B together are a schematic showing of a continuous system for making pipe in accordance with the invention.
Figure 1A:
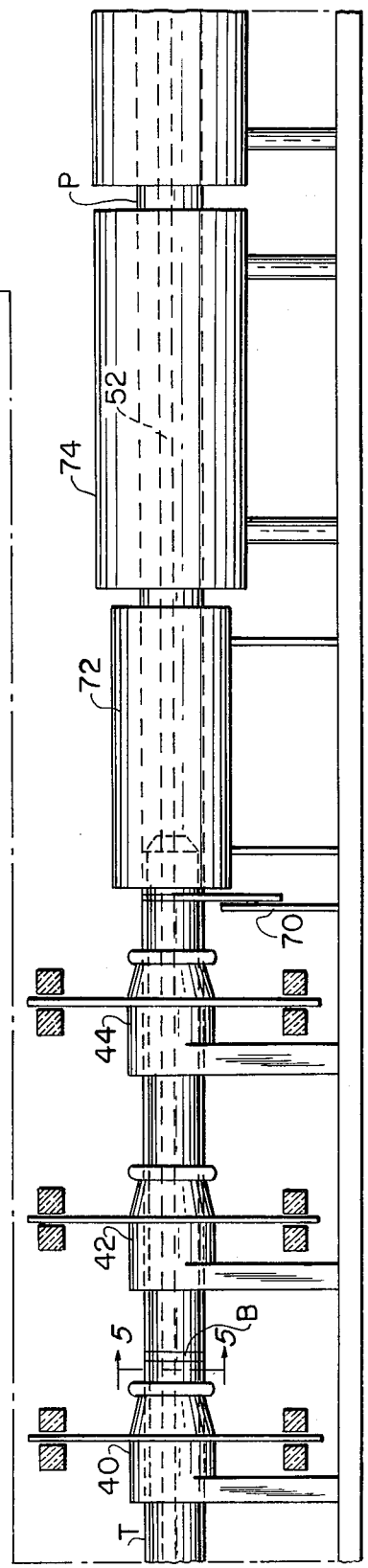
Figure 1B:
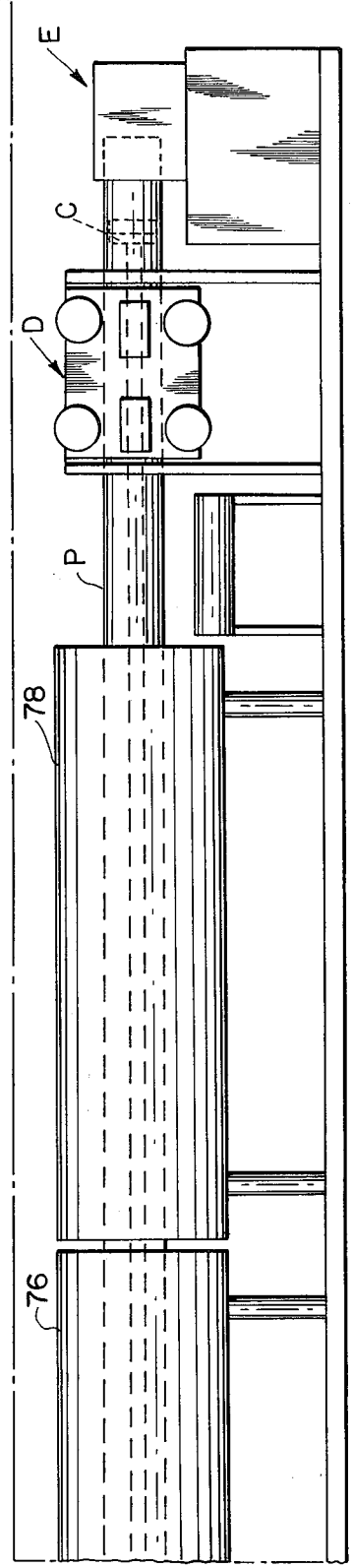

Referring to FIGS. 1 1A and 1B, the method of the invention generally comprises providing an air impervious tube T on axially fixed, hollow, rotatable mandrel A. The conveyor tube is made to become an integral part of the pipe assembly P.

Figure 4:
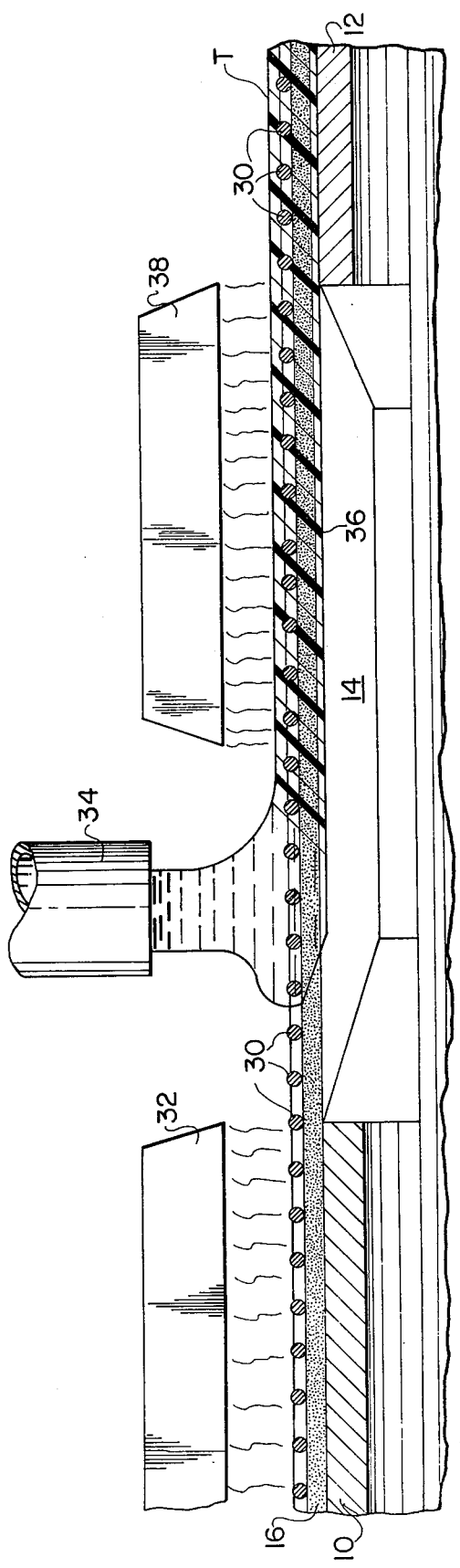
FIG. 4 is an enlarged partial elevational view partly in cross-section showing the formation of the conveyor tube.

Referring to FIG. 4, the mandrel A comprises a first mandrel section 10 and a second mandrel section 12 which is in alignment therewith and longitudinally spaced therefrom by a gap 14 having a diameter less than the diameter of the mandrel sections. The tube T of absorbent or permeable material is applied over the first mandrel section. More specifically, the tube is formed upon the first mandrel section from strips of absorbent material such as kraft paper. As shown in FIGS. 2 and 3, strips of paper, four in number in the illustrated form of the invention, and unwound from rolls 16, and applied longitudinally to the mandrel. The rolls are supported by welding brackets 18 to the mandrel. The brackets support spindles 20 for the rolls of paper strip. The advancing pipe assembly P of which the conveyor tube T becomes an integral part serves to draw the paper strips off the rolls so that the longitudinal edges of the strips are in slightly overlapping relationship. The longitudinally applied strips are guided to assume such relationship by a guide member 22 provided with slots 24 extended therethrough as shown in FIG. 3. The guide member, which is provided with a central aperture to allow the mandrel to extend therethrough, is suspended from longitudinally extending rods having their rearward ends fastened or welded to a pair of the roll holder brackets as shown in the aforementioned patents.

After the plurality of longitudinally extending paper strips have been laid on to the first mandrel section with their edges overlapped, the strips are reinforced by applying reinforcing strands coated with a substantially dry, partially gelled thermosetting resin while the strips are on the first mandrel section.

As shown in FIGS. 1 and 4, a plurality of rolls 26, preferably two, comprising strands 30 coated or impregnated with resin which is B-staged to a partial gel and cooled are unwound from the rolls and applied circumferentially about the longitudinally extending strips 16 of paper on the mandrel. Heat is applied by the heater 32 in an amount sufficient to cause the strands to be bonded to the paper tube while inhibiting the flow of resin to the inner side of the tube. Preferably, infrared heat is used. The resin flows sufficiently to bond the strands to the paper. It is important that the resin flow only enough to accomplish the bonding; the resin must not flow through the paper tube, for otherwise there will be adhesion to the underlying first mandrel section thereby stopping the line. A strip 31 of porous material such as tissue paper may be wound circumferentially about the strand reinforced tube before applying heat to effect bonding of the strands to the tube.

The strand reinforced tube is then pulled over the gap 14 and impregnated with resin from the metering pump 34. The gap is a reduction in mandrel diameter so that the resin which soaks through the tube will not bond to the mandrel. The resin applied at this point fully saturates the reinforced conveyor tube, flows completely through the permeable tube, saturates it, and preferably provides an inner coating or resin-rich liner 36 (FIG. 4). While still in the gap 14 or the area between the mandrel sections, heat, preferably in the form of infra-red heating, is applied at 38 while the resin saturated tube is traversing the gap to at least partially cure the resin. The resin impregnated tube having the resin-rich liner then continues onto the second mandrel section 12 which properly sizes and rounds up the tube for the subsequent winding operations.

While it might appear that the conveyor tube is rather weak during its course over the gap 14 because of the lack of mandrel support and the paper being wet, actually the tube is quite rigid because of the axial load which is applied to the advancing tube. The conveyor tube is leak proof as required for the subsequent pressurized winding operations. It has a resin-rich lining 36 for the chemical resistance which it will afford in the finished product, and the outer surface of the conveyor tube will bond well to the subsequently applied bands of continuous fiber elements coated or impregnated with a thermosetting resin.

Figure 5:
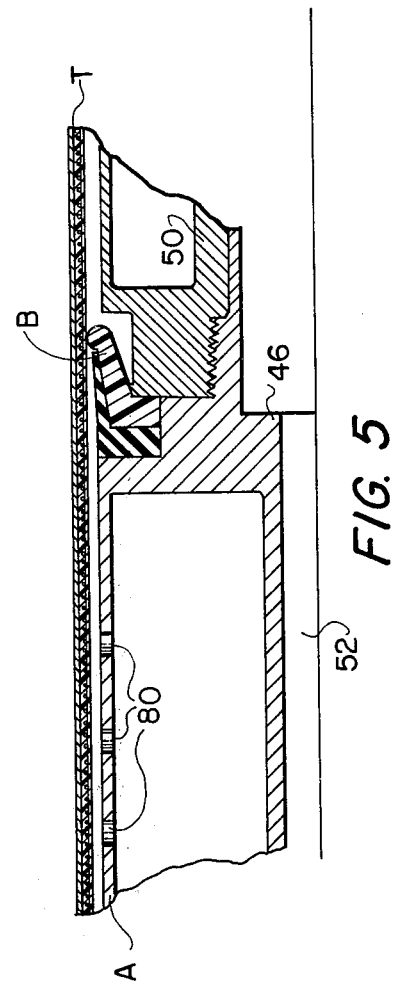
FIG. 5 is a partial vertical cross-sectional view taken approximately in the plane of line 5—5 of FIG. 1A.

Referring to FIG. 1A, a series of resin coated glass windings are applied at 40, 42 and 44 to the reinforced conveyor tube T. These windings are applied with substantial compressive forces. To assist in resisting these forces the conveyor tube is filled with air under pressure. It is at this point or station 46 that the mandrel ends. As shown in FIG. 5, there is a sealing cup B secured to the end of the mandrel A for engagement with the interior of the pipe being fabricated. If the windings of continuous fiber elements coated or impregnated with thermosetting resin were applied where the mandrel alone is located without air under pressure in the conveyor tube or between the mandrel and tube, a binding action would result to interfere with the progress or movement of the pipe assembly through the line. To maintain air under pressure within the pipe as it is being fabricated beyond and forward of the sealing cup B, a floating piston C is secured to the end of a tie-rod 48 which is supported back at the mandrel or a mandrel stabilizer 50 (FIG. 5). The floating piston is located just beyond the puller D, and before the station where predetermined sections of the pipe assembly are cut off at E.

Figure 6:
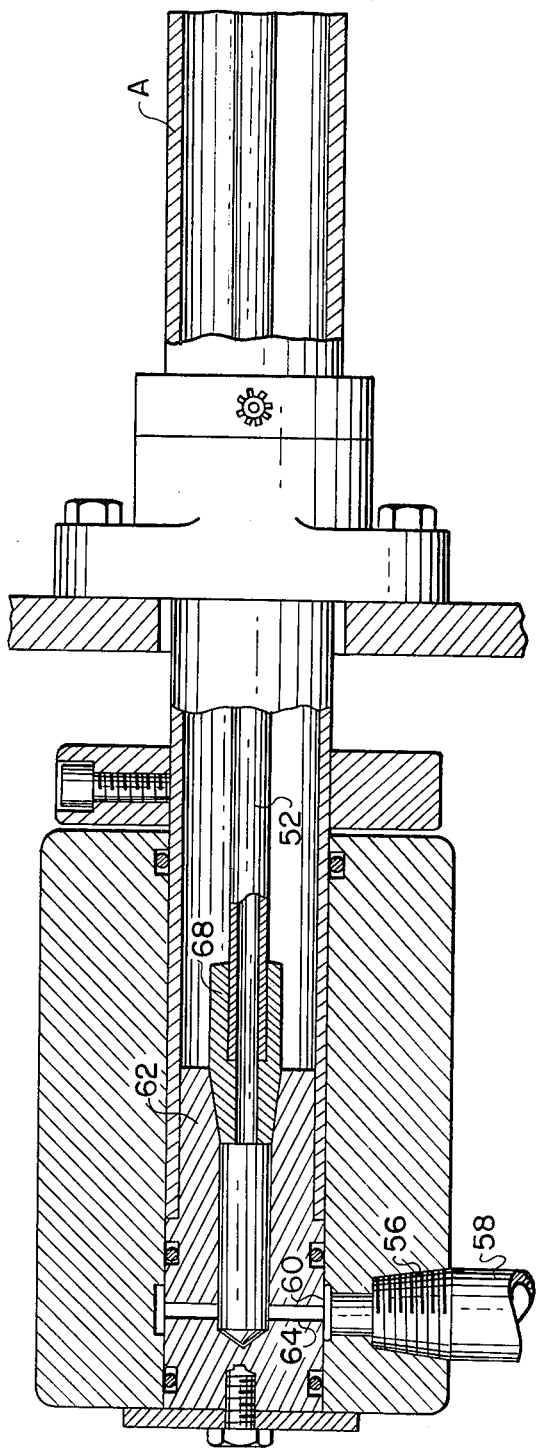
FIG. 6 is a detailed showing, in vertical cross-section, of means for supplying air under compression to a conduit extruding through the mandrel, the conduit terminating in the pipe assembly being fabricated.
Figure 7:
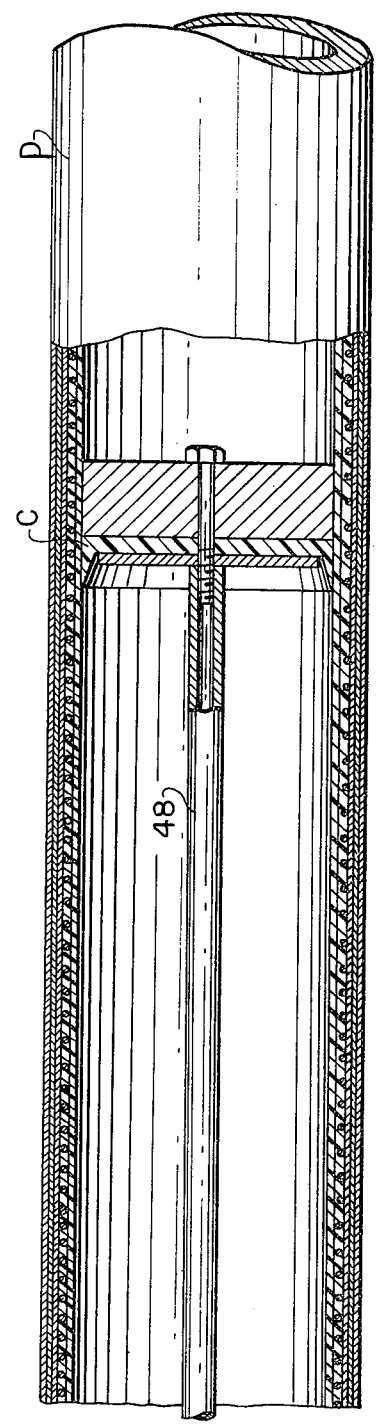
FIG. 7 is a detailed showing of a floating piston positioned within the advancing pipe assembly.

To supply air under pressure within the pipe assembly between the sealing cup B and the floating piston C a conduit or tube 52 is provided which extends from a stationary coupling member 54 at the front end of the line to the end of the mandrel at 46. As shown in FIG. 6, the stationary coupling member is provided with a threaded opening 56 extending through the wall thereof in which there is screwed a fitting 58 connected to a source of compressed air (not shown). In order that the compressed air may have access to the hollow conduit 52, the stationary coupling member is provided with a section 60 of increased inner diameter. A rotary coupling 62 is provided with a diametrically extending channel 64 to place the central bore 66 of the coupling in communication with the air line. One end of the tube 52 is force fitted or otherwise secured within the bore of a hollow connecting member 68, the opposite end of the connecting member being suitably secured within the bore 66 of the rotary coupling. By this arrangement the air line or tube 52 is connected for rotation with the rotary coupling and with the mandrel A through which it extends.

The conveyor tube T and the bands of resin coated fibrous material applied thereto are rotated and advanced by the control means or puller D having a construction as shown in the U.S. Pat. Nos. 3,507,412 and 3,700,519. The power for operating the puller D is supplied by a motor, pulley, and belt arrangement as disclosed in these patents.

As also shown in FIGS. 1A and 1B, after the windings are applied at 40, 42 and 44, a strip of tissue paper 70 is wound over the assembly and adhered thereto by the resin coating just previously applied. The assembly passed through a series of ovens 72, 74, 76, 78 to cure the resin. The pipe being continuously fabricated is rotated and it is linearly advanced by the puller D, following which predetermined lengths of the finished pipe are cut off at E. Any air which may leak by the sealing cup B escapes through the openings or holes 80 in the mandrel wall (FIG. 5), and out through the end of the mandrel to the atmosphere.

It will be understood that the reference to thermosetting resin preferably refers to resins of the epoxy and polyester types. The reference to continuous fiber elements preferably refers to glass filaments or rovings.

The described method of manufacture enables the simple formation of a strong conveyor tube which may be integrated in the finished pipe. Pipe having a very large diameter may be made in accordance with the method of the invention.

It is believed that the advantages and improved results furnished by the methods of the invention will be apparent from the foregoing description of a preferred embodiment of the invention. Various modifications and changes may be made without departing from the spirit and scope of the invention as sought to be defined in the claims.

I claim:

1. A method of continuously making fiber reinforced plastic pipe devoid of an inner removable liner comprising providing a first mandrel section and a second mandrel section in alignment therewith and longitudinally spaced therefrom by a gap, providing a tube of resin-absorbent material upon said first section, continuously advancing the tube across the gap and over the second mandrel section, applying a thermosetting resin to the tube as it passes over the gap in an amount sufficient to saturate the tube, at least partially curing the resin prior to the arrival of the advancing resin-saturated tube onto the second mandrel section to provide a conveyor tube, applying a plurality of bands of thermosetting resin composition coated continuous fiber elements onto said conveyor tube, and curing the resin to provide a fiber reinforced pipe assembly having the conveyor tube integral therewith.

2. A method according to claim 1 wherein the thermosetting resin applied to the tube as it passes over the gap is in an amount also sufficient to provide a coating on the inner side of the conveyor tube, and the resin saturant for the tube is cured prior to applying thereto the plurality of bands of thermosetting resin composition coated continuous fiber elements.

3. A method of continuously making fiber reinforced plastic pipe comprising providing a first mandrel section and a second mandrel section in alignment therewith and longitudinally spaced therefrom by a gap, applying a tube of resin-absorbent material upon said first section, applying reinforcing strands coated with a substantially dry, partially gelled thermosetting resin upon the tube while the tube is on the first mandrel section, applying heat sufficient to cause the strands to be bonded to the tube while inhibiting the flow of resin to the inner side of the tube, the heat being applied while the advancing tube is on the first mandrel section, continuously advancing the tube across the gap and over the second mandrel section, applying a thermosetting resin to the tube as it passes over the gap in an amount sufficient to saturate the tube, at least partially curing the resin prior to the arrival of the advancing resin-saturated tube onto the second mandrel section to provide a conveyor tube, applying a plurality of bands of thermosetting resin composition coated continuous fiber elements onto said conveyor tube, and curing the resin to provide a fiber reinforced pipe assembly having the conveyor tube integral therewith.

4. A method according to claim 3 wherein the thermosetting resin applied to the tube as it passes over the gap is in an amount also sufficient to provide a coating on the inner side of the conveyor tube, and the resin saturant for the tube is cured prior to applying thereto the plurality of bands of thermosetting resin composition coated continuous fiber elements.

5. A method according to claim 3 wherein the tube of absorbent material is formed on the first mandrel section from a plurality of strips of absorbent material applied substantially longitudinally to the mandrel section with their edges in overlapped relation, the reinforcing strands coated with a substantially dry, partially gelled thermosettiing resin being in the form of a strip having the strands extending lengthwise of the strip, and the strip is wound substantially circumferentially about the plurality of longitudinally extending strips of absorbent material.

6. A method according to claim 4 wherein the tube of absorbent material is formed on the first mandrel section from a plurality of strips of absorbent material applied substatially longitudinally to the mandrel section with their edges in slightly overlapped relation, the reinforcing strands coated with a substantially dry, partially gelled thermosetting resin being in the form of a strip having the strands extending lengthwise of the strip and the strip is wound substantially circumferentially about the plurality of strips of longitudinally extending absorbent material.

7. A method according to claim 6 including a circumferentially winding a strip of porous material about the strand reinforced tube following the aplication to the tube of the strip containing the reinforcing strands, the strip of porous material being applied prior to the application of heat to bond the strands to the tube.

8. A method according to claim 1 wherein the gap between the first and second mandrel sections is provided by a mandrel section having a diameter less than the diameter of the first and second sections, wherein a tube extends through the mandrel for the passage of air under pressure, and air under pressure is contained in the pipe assembly as it is being fabricated beyond where the resin saturant for the conveyor tube is cured, the plurality of bands of thermosetting resin composition coated continuous fiber elements being applied onto the conveyor tube where the pipe assembly contains air under pressure.

9. A method according to claim 3 wherein the gap between the first and second mandrel sections is provided by a mandrel section having a diameter less than the diameter of the first and second sections, wherein a tube extends through the mandrel for the passage of air under pressure, and air under pressure is contained in the pipe assembly as it is being fabricated beyond where the resin saturant for the conveyor tube is cured, the plurality of bands of thermosetting resin composition coated continuous fiber elements being applied onto the conveyor tube where the pipe assembly contains air under pressure.

10. A method according to claim 4 wherein the gap between the first and second mandrel sections is provided by a mandrel section having a diameter less than the diameter of the first and second sections, wherein a tube extends through the mandrel for the passage of air under pressure, and air under pressure is contained in the pipe assembly as it is being fabricated beyond where the resin saturant for the conveyor tube is cured, the plurality of bands of thermosetting resin composition coated continuous fiber elements being applied onto the conveyor tube where the pipe assembly contains air under pressure.

11. A method according to claim 5 wherein the gap between the first and second mandrel sections is provided by a mandrel section having a diameter less than the diameter of the first and second sections, wherein a tube extends through the mandrel for the passage of air under pressure, and air under pressure is contained in the pipe assembly as it is being fabricated beyond where the resin saturant for the conveyor tube is cured, the plurality of bands of thermosetting resin composition coated continuous fiber elements being applied onto the conveyor tube where the pipe assembly contains air under pressure.

* * * * *